Oct. 30, 1945.　　　G. W. ASHLOCK, JR　　　2,387,709
ORIENTATION OF FRUIT
Filed Feb. 13, 1945　　　3 Sheets-Sheet 1
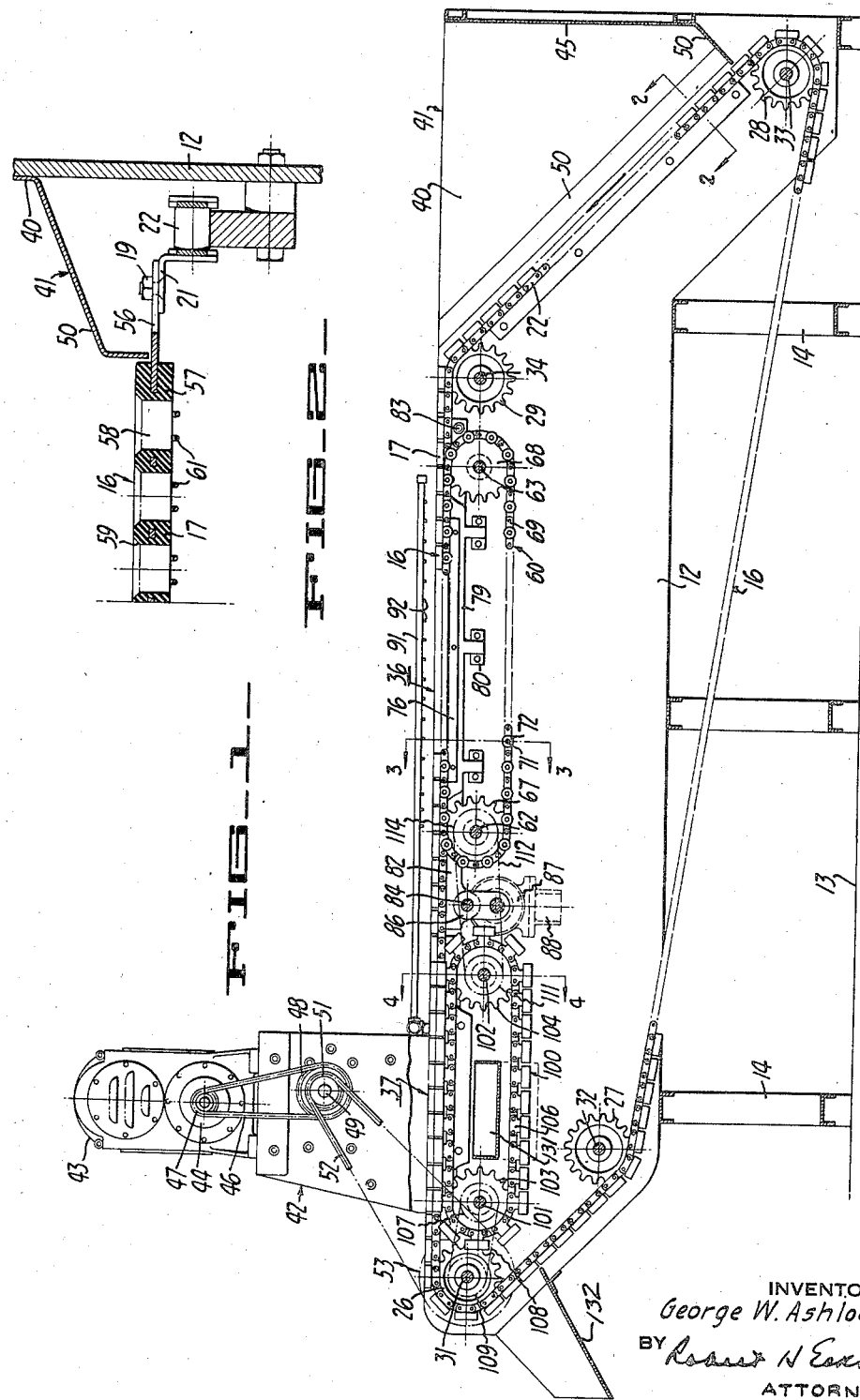
INVENTOR
George W. Ashlock Jr.
BY
ATTORNEY

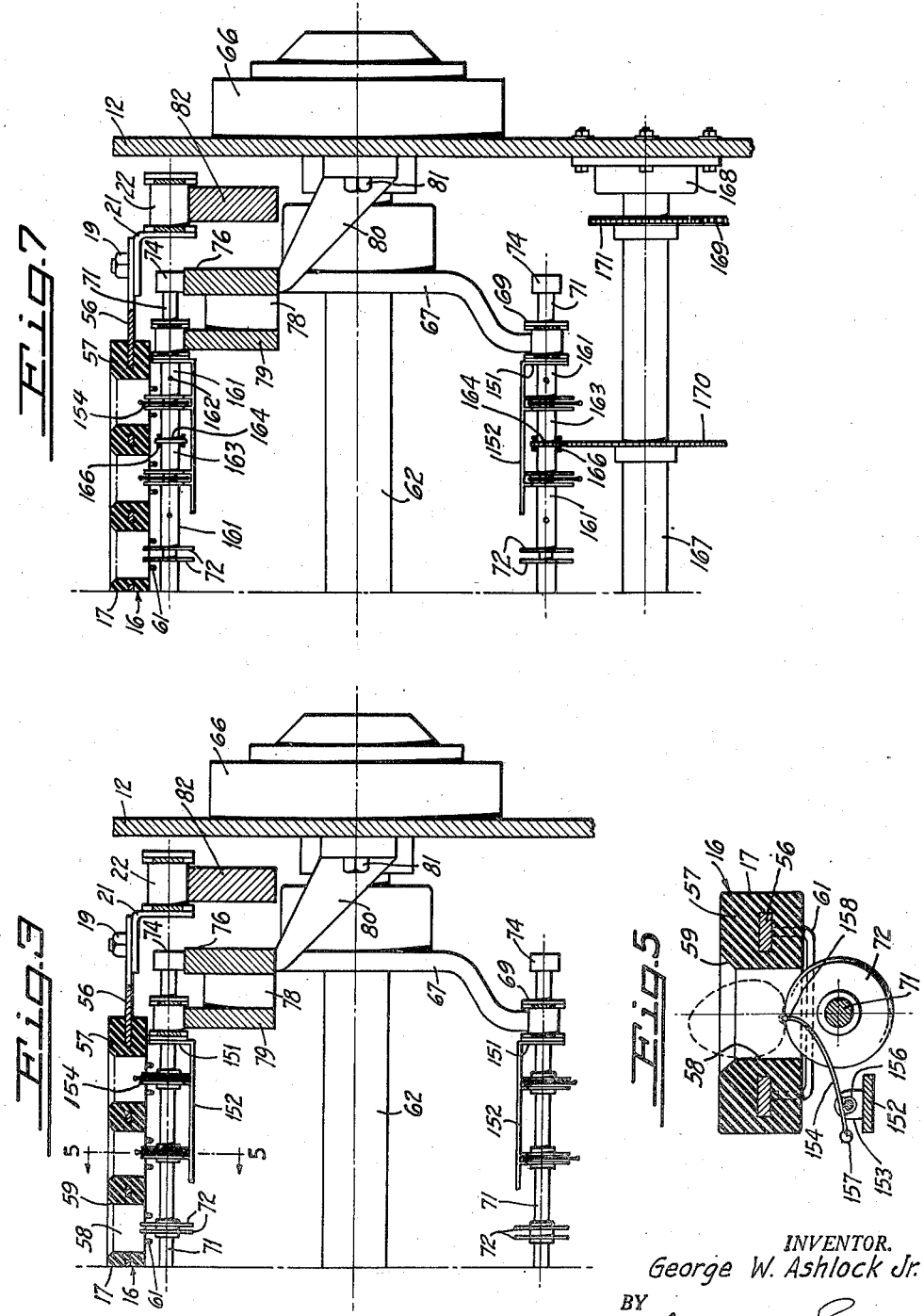

Oct. 30, 1945.　　G. W. ASHLOCK, JR　　2,387,709
ORIENTATION OF FRUIT
Filed Feb. 13, 1945　　3 Sheets—Sheet 3
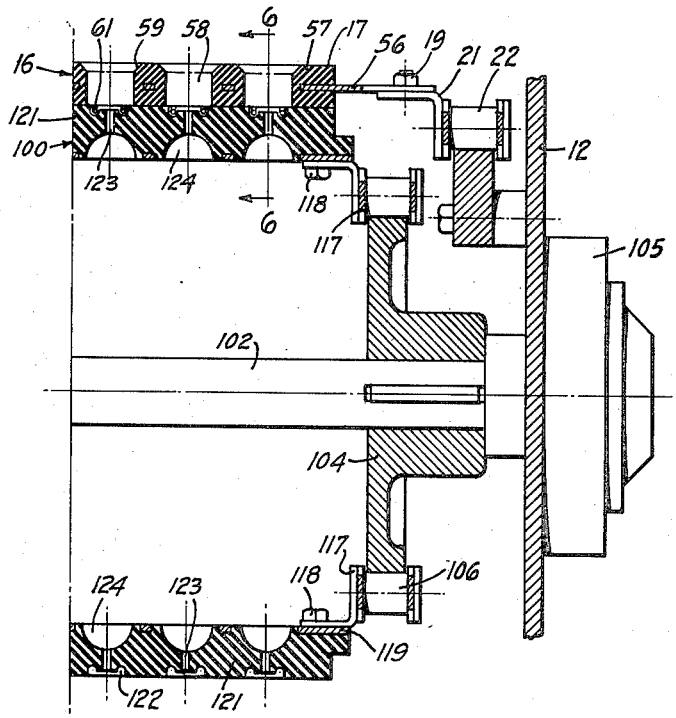
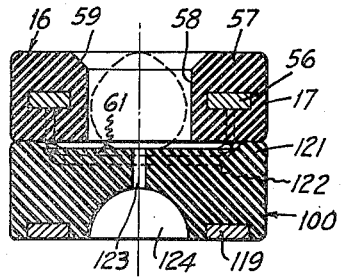
INVENTOR.
George W. Ashlock Jr.
BY
Robert N. Eckhoff
ATTORNEY Patented Oct. 30, 1945

2,387,709

UNITED STATES PATENT OFFICE 2,387,709

ORIENTATION OF FRUIT

George W. Ashlock, Jr., Oakland, Calif.

Application February 13, 1945, Serial No. 577,635

12 Claims. (Cl. 198—33)

This invention relates to the orientation of generally spherical articles having at least one face thereon capable of stably supporting the article on a horizontal surface so that it will be in suitable position for subsequent processing of the articles. As such an article, and solely by way of example, I particularly mention cherries; the machine of the present invention is particularly adapted to the orientation of cherries and other fruit having a stem indentation and to the subsequent removal of their stone through the stem indent.

It is in general the broad object of the present invention to provide a novel orientation device for such an article as cherries.

Another object of the present invention is to provide a machine enabling articles such as cherries to be successfully oriented even though the cherries are irregular in shape and somewhat irregular as to size. Previous cherry orienting devices have been successful if the cherries were uniform both as to size and shape. One cannot control the shape of a cherry and since the mechanical sizing operations usually practiced depend upon the shape of the cherry, various size cherries will come through in the same grade as a result of a mechanical grading operation. The machine of the present invention is particularly adapted to produce a high percentage of articles such as cherries oriented with respect to the stem indent and irrespective of their shape.

It has been my observation that while irregularly shaped articles, as cherries, can be oriented with their stem end down to the same extent nearly as regularly shaped cherries or spherical cherries, the former are less stable in their oriented position. In the present machine, means are provided for orienting a cherry and for maintaining it in this position once it is attained.

The invention includes other objects and features of advantage, some of which, together with the foregoing, will appear hereinafter wherein the present preferred form of machine of this invention is disclosed.

In the drawings accompanying and forming a part hereof,

Figure 1 is a side elevation partly in section illustrating a machine embodying the present preferred form of a machine embodying this invention.

Figures 2, 3, 4, 5 and 6 are respectively section lines taken along the designated section lines 2—2, 3—3 and 4—4 in Figure 1; 5—5 in Figure 3, and 6—6 in Figure 4.

Figure 7 is a section corresponding to that of Figure 3 but illustrating a modified form of the structure.

The frame

The machine of the present invention includes a suitable frame structure made up of suitable structural elements including side plates 12 joined together by suitable cross bracing (not shown) and supported as by legs 14 from a supporting surface such as the floor 13. The side plates 12 are spaced apart a suitable distance, the plates being generally rectangular in shape except as appears in the right hand portion of Figure 1 whereat the plates depend to almost the floor level.

The feed conveyor

A first or feed conveyor structure generally indicated at 16 is provided. This conveyor structure is made up of a series of conveyor members generally indicated at 17 (presently further described in detail) secured by bolts 19 to angle pieces 21 on conveyor chains 22 positioned on opposite sides of the machine. The chains 22 pass about suitable supporting sprockets, there being four sets of these, 26, 27, 28 and 29, the sprocket sets being respectively secured on shafts 31, 32, 33 and 34, suitably journaled in the side plates 12 of the machine. Shafts 31 and 34 are normally positioned at about the same level so that the run of the conveyor between them is normally horizontal providing an orientation section generally indicated at 36 and a subsequent pitting or other processing section 37.

Shaft 32 is positioned somewhat rearwardly and below shaft 31 so that the conveyor returns downwardly and rearwardly toward shaft 33, the chains passing about the sprockets on shaft 33 to move upwardly toward the sprockets on shaft 34 through a feed hopper generally indicated at 41 and presently further described.

The conveyor members 17 making up the conveyor 16 preferably include apertured metal plates 56 covered with rubber 57 suitably bonded thereto and apertured as at 58, the aperture size being slightly larger than the cherries or other articles to be handled. The rubber facing is preferably flared as at 59 adjacent the upper side of each aperture to facilitate placing of articles in the aperture. Suitable article supporting means such as wires 61 are positioned across each aperture to support an article therein during its transportation from one processing region to another. The wires thus act solely as support means for the cherries or other articles and do not actively cooperate with the article undergoing orientation as will presently appear.

The drive and pitting head

Secured on the side plates is a suitable super-structure 42 carrying an electric motor 43 and a variable speed reducer 44 connected by a chain 46 passed about its drive sprocket 47 to a sprocket 48 on a shaft 49 journaled in the super-structure. The super-structure generally includes suitable pitting or stoning mechanisms such as that disclosed in my Patents 2,157,518 and 2,219,832. Shaft 49 also carries a sprocket 51 thereon connected by a chain 52 to a sprocket indicated at 53 on shaft 31 so that the stoning mechanism and the conveyor 16 are driven in timed relationship, the speed and relation between the two being adjusted by a suitable means such as that disclosed in Figure 1 in my Patent 2,157,518.

The feed hopper

To provide for loading of the conveyor structure 16, hopper 41 is included and is provided with side plates 40, an end plate 45 and suitable end and side baffles 50 therein after the manner disclosed in my Patent 2,190,970. The conveyor 16 moving upwardly in the direction of the arrow through the hopper 41, each aperture in the conveyor retains a single article which it carries along out of the feed hopper to the presently discussed orientation section 36.

The orientation operation

To provide for orientation of the articles I rotate the cherries supported in the apertures 58. This rotation is preferably effected in a continuous manner during passage of the articles through the orientation section 36. Accordingly, to this end, I conveniently mount shafts 62 and 63 between the side plates 12 in suitable journals 66. On shaft 62 I secure a pair of spaced sprockets 67 while a pair of spaced sprockets 68 are secured on shaft 63, these sprockets serving to support opposite spaced chains 69 providing an orientation conveyor 60. Mounted between the chains and rotatably supported therein are a plurality of shafts 71 each carrying several pairs of cooperating spaced wheels 72, each wheel pair being secured to the shaft and extending upwardly into an aperture 58. Each shaft 71 is rotated relative to the aperture 58 to rotate an article in the aperture engaged with the pair of wheels. This is accomplished during movement of the conveyor 60 by a toothed gear 74 at each end of the shaft engaging a fixed toothed rack 76 on brackets 80 secured by studs 81 to each of the side plates 12 of the machine. Instead of rotating the shafts 71 they can be oscillated by providing spaced racks above and below gear 74 and alternately engaged by the gear; or each rack 76 can be replaced by a chain moved in the same direction or opposite to conveyor 60 and at a different speed from that of conveyor 60.

Rotation of each wheel pair is sufficient to result in orientation of the articles such as cherries. Depending upon the weight of the articles and the size, the speed of the wheels can be varied. However, with usual size cherries I have successfully used a pair of ¾" wheels having beveled edges, each wheel being about $\frac{1}{16}$" to $\frac{3}{32}$" thick, rotating at about 220 R. P. M. and extending into the aperture for about ¼".

Oriented fruit lock

To ensure that a cherry which has been rotated until its longitudinal axis is in a vertical position and the flat, annular portion surrounding the stem end is horizontal is maintained in this position, even though rotational effort is still exerted, means are provided to hold the cherry against further rotation. In the form of the invention which is shown in Figures 3 and 4 I provide an arm 151 on each chain link supporting shaft 71 for rotation. These arms extend forwardly and downwardly to position a bar 152 across the machine between the chains 69 parallel to but in advance of each shaft 71. At spaced intervals across the bar pairs of ears 153 are positioned. Between each pair a finger 154 is hinged as at 156, each finger carrying a weight 157 at one end to bias the finger to move counter clockwise in Figure 5. The other end 158 of the finger is thus urged into engagement with a cherry in each aperture 58, each finger passing between the associated pair of wheels 72. When a cherry is in its oriented position, the end 158 of finger 154 enters the stem indent, locking the cherry against further rotation even though the fruit continues to be urged to rotate by the wheels 72.

In the form of the device so far described, each wheel pair on shaft 71 rotates in the same direction. In the form of the invention shown in Figure 7, each wheel of each pair rotates in a direction opposite to that of the other wheel in the pair. This is accomplished by mounting the wheels in pairs at each end of a short tubular shaft 161 and 163 which fits rotatably on shaft 71. The first wheel, that on the extreme right hand end of shaft 71 in Figure 7, is provided on only a short length of shaft and this is fixed by pin 162 to shaft 71 as is the next alternate shaft. The intermediate shaft 163 is rotatable on the shaft 71, a sprocket 164 being positioned on this shaft. A chain 166 is passed about each of sprockets 164, each chain being engaged by a drive sprocket 170 on its return pass. Each sprocket 170 is driven by shaft 167 mounted between bearings 168 in side plates 12 and driven by a chain 169 passed over a sprocket 171 on shaft 167 and about a sprocket (not shown) on shaft 32. In this manner each wheel pair can be appositely driven and at different speeds to provide a rotational twist to an article.

Vibration of the articles

In accordance with this invention I preferably vibrate the articles undergoing orientation at the same time they are subjected to rotation. Conveniently this is achieved by vibrating rails 82 supporting conveyor 16 in the orientation region 36 although it can also be accomplished by vibrating conveyor 60. To this end I pivotally support rails 82 on opposite sides of the machine with a pivotal support 83 at the feed end thereof while at the other end I join the rails together with a suitable shaft 84 and connect this shaft by a link 86 to a suitable vibrating mechanism indicated generally at 87 and mounted upon a bracket 88 on one side of the plates. The rate of vibration can vary over fairly wide limits and I have successfully used frequencies varying between 1,200 and 12,000 cycles per minute. Depending upon the speed of movement of the conveyor 16 and the rate of rotation of the wheels, the speed of vibration can be varied and the three can be varied together to the end that the efficiency of orientation for a selected group of articles is a maximum. To this end, therefore, the vibrating mechanism 87 is preferably made adjustable because it is subject to the greatest variation relative to the other variables.

Fluid flooding

Orientation of the articles is normally facilitated if they are maintained wet during the orientation operation and to this end I preferably position over each row of articles undergoing orientation suitable liquid supply pipes indicated at 91 and provided with a plurality of jets 92 to eject a suitable fluid, such as water, a processing solution or any suitable liquid lubricating mechanism onto the articles, particularly cherries undergoing orientation.

The pitting mechanism

In the machine disclosed herein it is contemplated that the articles are cherries and that they will be stoned. Accordingly, I provide the pitting mechanism previously mentioned as well as other suitable means to support the cherries during this operation. To this end I accordingly mount shafts 101 and 102 in the side plates by means of suitable bearings indicated at 105. To each of the shafts are keyed suitable sprocket sets 103 and 104 and about the sprockets are trained chains 106 to provide a pitting chuck conveyor 100. A sprocket 107 on shaft 101 is connected by a chain 108 to a sprocket 109 on shaft 31 whereby the conveyor 100 is driven. Shaft 102 also includes a sprocket 111 connected by a chain 112 to a sprocket 114 on a shaft 62 whereby conveyor 60 is driven, both conveyors being driven in time with the main conveyor 16.

Each conveyor chain 106 includes a plurality of spaced angle pieces 117 connected by studs 118 to suitable apertured metal base plates 119 each having bonded thereto the rubber faces indicated at 121, the rubber being bonded to the metal base plate at least along one face thereof and recessed at 122 to receive the article support members 61. A plurality of fruit stone passages 123 are provided to receive and pass the stones ejected from the fruit. To provide proper resilience, each section of the rubber facing is apertured or relieved as at 124 to provide a resilient support for that region of the rubber facing adjacent to the stone passage 123.

Operation

While it is believed to be clear from the foregoing that the operation of the device is fully set forth, a brief résumé may assist in this understanding. The main conveyor 16 is driven through the motor 43 and the speed reducer 44, the orientation conveyor 60 carrying the rotating wheels and the conveyor 100 carrying the pitting support members, each being driven in a timed relationship and at the same rate as the main conveyor properly to position their cooperating elements. With suitable articles to be processed such as cherries placed in the hopper 41, the movement of conveyor 16 through the hopper results in each apertured receptacle in the main conveyor 16 being filled with an article and carried on to the orientation section 36. In this region the main conveyor is rapidly vibrated by rails 82 and, at the same time, each article on the conveyor is lifted from its support means 61 by the rotating wheel pairs 72, the wheel and the vibrating means cooperating, in the preferred machine, to orient the cherry in that position shown in Figure 5 with the stem indent end of the cherry abutting the wheel in which position the cherry is locked by finger 154. To attain this, the wheel pairs rotate in either the modification of Figure 3 or Figure 7 each article about a horizontal axis until the article has been correctly oriented and locked. Once oriented the article remains locked in this position even though the wheel continues to rotate and the article is vibrated. Finally conveyor 16 moves beyond that point whereat it cooperates with conveyor 60 and the wheel pairs 72 and fingers 154 are removed from their supporting engagement with the articles. This occurs without the articles becoming disturbed or removed from their oriented position. As the conveyor 16 moves on toward the cherry stoning station the article support is taken over by the pitting chucks on the pitting chuck conveyor 100. In this position the articles are moved on toward the pitting station for pitting, the pits being ejected through the passages 123 into the pit receptacle trough 131 while the articles pass on and fall by gravity into the trough 132 as the conveyor passes downwardly about the sprockets on shaft 32.

I claim:

1. A machine for positioning a generally spherical indented article having at least one face thereon capable of supporting the article stably on a horizontal surface, said machine comprising a first conveyor movable over a path at a substantially constant rate, said conveyor including a series of apertures each adapted to restrain an article against unrestricted horizontal movement, a second conveyor movable at said rate over a path to position a pair of spaced wheels beneath each aperture to support an article in said aperture and rotate said supported article about a horizontal axis, means for rotating a positioned wheel about a horizontal axis, and means extending between said wheels and biased to move upwardly therebetween to engage the indent in said article and lock the article with said face horizontal.

2. A machine for positioning a generally spherical indented article having at least one face thereon capable of supporting the article stably on a horizontal surface, said machine comprising a first conveyor movable over a path, said conveyor including means providing a series of apertures each adapted to restrain an article against unrestricted horizontal movement, a second conveyor movable over a path to position a wheel pair beneath said aperture to support an article in said aperture and rotate said supported article about a horizontal axis, means for rotating said wheel pair about a horizontal axis, means for vibrating an article during said rotation and means extending between said wheels and biased to move upwardly therebetween to engage the indent in said article and lock the article with said face horizontal.

3. In a device for orienting indented fruit, means providing a vertically extending aperture confining a fruit against unrestricted horizontal movement, a pair of spaced wheels adapted to support one of said fruit when said fruit is positioned in said aperture, a horizontal shaft supporting said wheel pair for rotation cooperatively adjacent said aperture to rotate said fruit when supported in said aperture by said wheel pair, means for rotating said wheels, means extending between said wheels and biased to move upwardly therebetween to engage the indent in said article and lock the article with said face horizontal.

4. In a device for orienting indented fruit, a fruit conveyor movable over a path and including means providing a series of vertically extending receptacles, each of substantially uniform cross-section, a pair of wheels, a horizontal shaft supporting said wheels for rotation, means for rotating said wheels, a second conveyor movable over a path having a portion thereof parallel with and contiguous to said first conveyor path, said second conveyor carrying said wheels and shaft and positioning said wheel pair with a portion of said wheels extending into said receptacle to engage and rotate a fruit therein over only said contiguous path portion, means extending across the bottom of said receptacle and positioned to admit said wheels and support fruit when not engaged by said wheels, and means extending between said wheels and biased to move upwardly therebetween to engage the indent in said article and lock the article with said face horizontal.

5. In a device for orienting indented fruit, a fruit conveyor movable over a path and including means providing a series of vertically extending receptacles, each of substantially uniform cross-section, a pair of wheels, a horizontal shaft supporting said wheels for rotation, means for rotating said wheels, a second conveyor movable over a path having a portion thereof parallel with and contiguous to said first conveyor path, said second conveyor carrying said wheels and shaft and positioning said wheel pair with a portion of said wheels extending into said receptacle to engage and rotate a fruit therein over only said contiguous path portion, means extending across the bottom of said receptacle and positioned to admit said wheels and support fruit when not engaged by said wheels, and a finger pivoted intermediate its ends and biased to engage fruit on said wheels and lock said fruit in an oriented position with the indent in the fruit aligned with the vertical axis of the receptacle.

6. A device as in claim 3 including means for rotating one wheel in each pair of wheels in a direction opposite to that of the other wheel in said pair of wheels on said shaft.

7. A device as in claim 2 including means for rotating one wheel in each pair of wheels in a direction opposite to that of the other wheel in said pair of wheels.

8. A device as in claim 3 including means for rotating each wheel in each pair of wheels in the same direction as that of the other wheel in said pair of wheels on said shaft.

9. A device as in claim 2 including means for rotating each wheel in each pair of wheels in the same direction as that of the other wheel in said pair of wheels.

10. In an indented fruit processing machine, the combination of a holder for the fruit having an opening in its underside, means for admitting fruit to the holder in any position, means for engaging the fruit in said holder to rotate the fruit in said holder, a movable finger extending upwardly through said opening from said underside substantially in alignment with a vertical axis passing substantially through the center of said opening, and means biasing said finger to engage and ride over the surface of a fruit in said holder until the indent is facing downward with its longitudinal axis substantially coincident with said vertical axis, and whereupon the finger is moved to enter said indent and lock the fruit against further rotation by said fruit engaging means.

11. In an indented fruit processing machine, the combination of a holder for the fruit having an opening in its underside, means for admitting fruit to the holder in any position, a wheel positioned to engage fruit in said holder to rotate the fruit in said holder, means for rotating said wheel, a movable finger extending upwardly through said opening from said underside substantially in alignment with a vertical axis passing through the center of said opening, and means biasing said finger to engage and ride over surface of a fruit in said holder until the indent is facing downward whereupon the finger enters said indent to lock the fruit against further rotation by said wheel and with the longitudinal axis of the stem indent substantially coincident with said vertical axis.

12. In an indented fruit processing machine, the combination of a holder for the fruit having an opening in its underside, means for admitting fruit to the holder in any position, a pair of wheels positioned to engage fruit in said holder to rotate the fruit in said holder, means for rotating said wheels, a movable finger extending upwardly between said wheels and through said opening from said underside substantially in alignment with a vertical axis passing through the center of said opening, and means biasing said finger to engage and ride over surface of a fruit in said holder until the indent is facing downward whereupon the finger enters said indent to lock the fruit against further rotation by said wheels and with the longitudinal axis of the stem indent substantially coincident with said vertical axis.

GEORGE W. ASHLOCK, Jr.